Sept. 27, 1949.　　　　C. J. W. CLASEN　　　　2,483,181
SPRING GROUP
Filed May 19, 1948　　　　　　　　　　　　　2 Sheets-Sheet 1
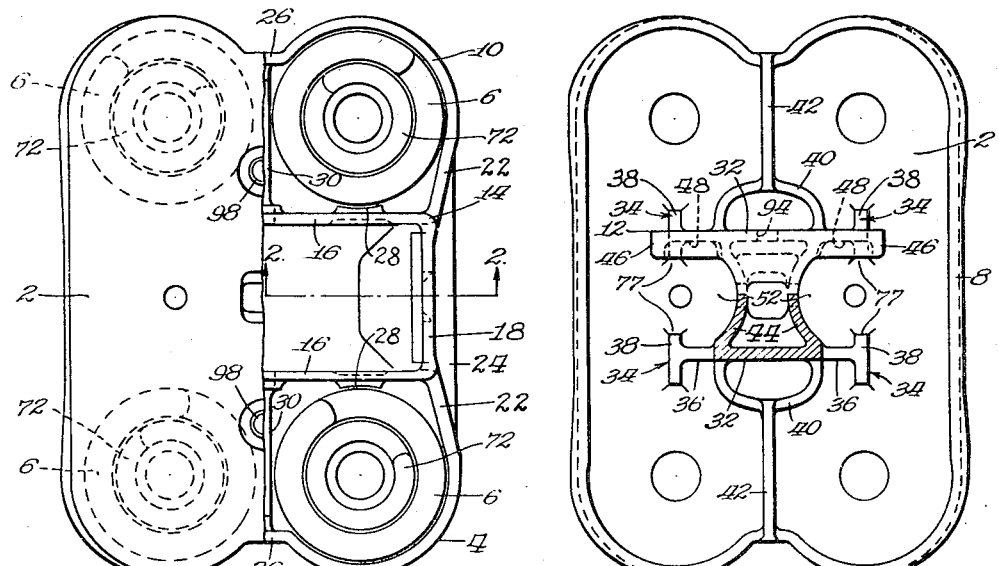
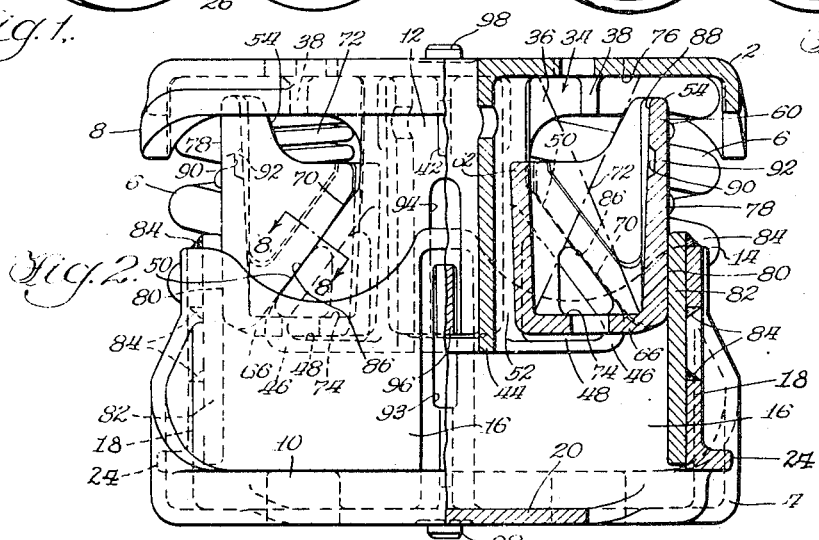
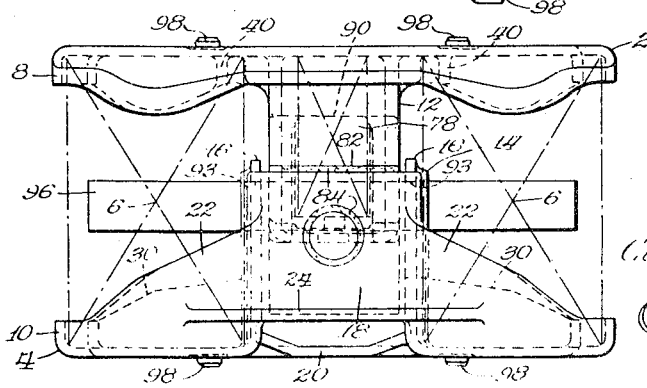
INVENTOR.
Claus J. Werner Clasen
BY Sept. 27, 1949.　　　　C. J. W. CLASEN　　　2,483,181
SPRING GROUP Filed May 19, 1948　　　　　　　　　　　　　2 Sheets-Sheet 2

INVENTOR.
Claus J. Werner Clasen
BY

Patented Sept. 27, 1949

2,483,181

UNITED STATES PATENT OFFICE 2,483,181

SPRING GROUP

Claus J. Werner Clasen, Chicago, Ill., assignor to American Steel Foundries, Chicago, Ill., a corporation of New Jersey Application May 19, 1948, Serial No. 28,012

3 Claims. (Cl. 267—9)

1

This invention relates to spring groups and more particularly to such a structure incorporating a friction device.

A general object of the invention is to provide a friction device which will afford control of the oscillations of the coil springs of the spring group.

Another object of the invention is to devise a spring group incorporating a friction device arranged to operate in parallel with the coil springs and comprising telescoping followers, one of which is provided with wedge faces sloping toward friction surfaces on the other follower and carrying spring-actuated friction shoes on said wedge faces in engagement with said friction surfaces.

A further object of the invention is to design a spring group possessing the necessary strength by constructing the top and bottom plates as well as the followers of special form by so distributing the material without encroaching on the available spring space or reducing the efficiency of the friction device as to produce the necessary strength at the particular points which experience has proved are most apt to yield when subjected to the severe stresses encountered in service.

These and other objects of the invention will become more apparent from the specification and the drawings, wherein in certain views certain parts may be omitted to more clearly illustrate the construction.

In the drawings:

Figure 1 is a top plan view of a spring group incorporating the features of the invention, the right half of the top spring plate being cut away and the friction device removed to more clearly illustrate the construction of the bottom follower and plate.

Figure 2 is an end view of Figure 1, partly in section, the section being taken substantially in a transverse vertical plane as indicated by the line 2—2 of Figure 1.

Figure 3 is a side elevational view of Figure 1.

Figure 4 is a plan view of the top spring plate taken from the bottom thereof with the top follower shown partly in horizontal section.

Figure 5:
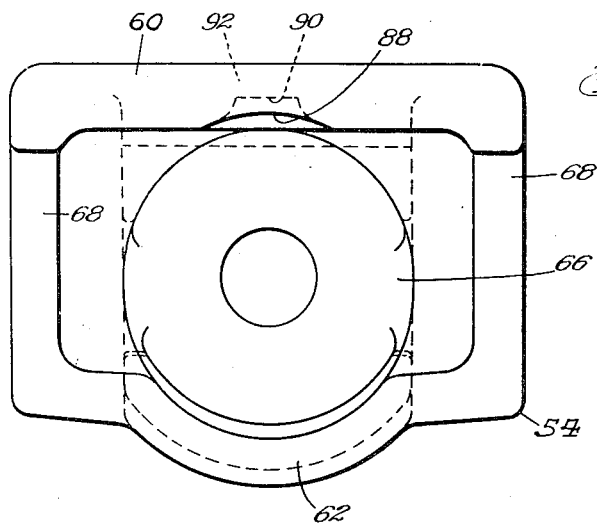
Figures 5 to 7 illustrate my novel friction shoe, Figure 5 being a top plan view thereof, Figure 6 being a rear elevational view thereof, and Figure 7 being a side elevational view thereof.
Figure 8:
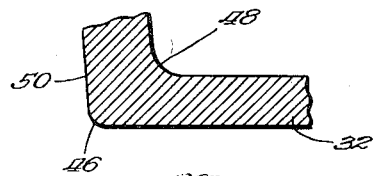
Figure 8 is a fragmentary view of a portion of the top follower taken in the plane substantially as indicated by line 8—8 of Figure 2.

Describing the invention in detail, the spring

2 group comprises a top spring plate 2 and a bottom spring plate 4. Between these plates are interposed coil springs 6, 6, arranged one spring to each corner. Around the peripheries of the respective plates are formed inturned flanges 8 and 10 confining the springs 6, 6, as hereinafter more fully described.

Centrally of the group between the coil springs is disposed my novel form of friction device having a top follower 12 formed integral with the top spring plate 2 and a bottom follower 14 formed integral with the bottom plate 4.

The bottom follower 14 is a rectangular boxlike structure or housing having substantially parallel vertical side or lateral walls 16, 16 and substantially parallel vertical end walls 18, 18. The side walls 16, 16 extend transversely of the spring plate 4 and merge at their lower ends with a horizontal wall 20 which is formed as part of the bottom plate 4. The end walls 18, 18 extend longitudinally of the plate 4 and at their lateral edges merge with the corresponding ends of the side walls 16, 16 as well as with vertical gussets 22, 22 which are formed as portions of the inturned flange 10 of the bottom plate. Externally at the lower ends of the respective end walls 18, 18, which are spaced vertically from the bottom plate, are formed horizontally disposed reinforcing ribs 24 extending lengthwise longitudinally of plate 4 and at opposite ends thereof merging with the adjacent gussets 22, 22. It will be noted that the end walls 18, 18 of the bottom follower 14 are offset inwardly at the lateral edges of the lower spring plate 4, and that the said gussets 22 with the adjacent portions of the inturned flange 10 flare outwardly of the associated end wall and that toward the longitudinal ends of plate 4 the portions of flange 10 closely follow the contours of the adjacent springs and with inwardly offset portions thereof as at 26, 26 at the ends of plate 4 afford convenient confining means for the springs. It will also be noted that on the remote sides of the side walls 16, 16 adjacent each end thereof is provided a boss 28 formed to afford, in conjunction with the before-mentioned adjacent portions of flange 10, positioning means for the associated spring.

To further strengthen the side walls 16, 16, the bottom plate 4 is formed at substantially its longitudinal center line at opposite sides of the bottom follower 14 with vertical ribs 30, 30, each rib 30 extending between and merging with the external side of the adjacent wall 16 and the internal side of the adjacent portion of flange 10 and, as may be readily seen in Figure 1, each rib 30 extends between springs 6, 6 at the associated end of plate 4 to afford positioning means therefor. In addition, the ribs 30, 30 strengthen the lower plate 4.

The top follower 12 is a skeletal structure dimensioned to accommodate its convenient reception between the side and end walls of the bottom follower 14. The top follower comprises spaced side walls 32, 32 arranged generally parallel to the side walls 16, 16 of the bottom follower 14. The upper ends of the side walls 32, 32 merge with the underside of the top plate 2 and at their upper lateral edges are further joined to the top plate by means of gussets 34, 34 integral with the underside of the top plate. Each gusset 34 is of T shape in plan and comprises a web 36 extending in the plane of the associated wall 32. The outer end of each web 36 terminates in a web 38 extending transversely thereof. Thus it will be noted that the upper end of each wall 32 is not only connected at its upper end in the plane thereof but also, by means of webs 38 of the respective gussets 34, at points which are disposed at opposite sides of said plane.

The upper ends of the side walls 32, 32 are each additionally connected adjacent their lateral edges to the top plate 2 by means of a U-shaped reinforcing web 40. Each web 40 is formed as an integral part of the underside of the top plate 2 and has the spaced legs thereof connected to the outer or external side of the upper end of the associated side wall 32. To further strengthen the top plate it is provided with spaced vertical ribs 42, 42 which extend longitudinally of the top plate 2 along the longitudinal median line thereof between the base of each U-shaped web 40 and an inwardly offset portion of the inturned flange 8. It will be noted that the ribs 42, 42 are disposed at opposite ends of the top plate and extend between the adjacent springs 6, 6, affording with the adjacent portions of flange 8, which are contoured to the associated springs, and the ends of webs 38 of the adjacent gussets 34 convenient positioning means for the upper ends of the associated springs.

Between the side walls 32, 32 at opposite sides of the longitudinal center line of the top plate are provided arcuate webs 44, 44 which are bowed toward each other, said webs 44, 44 merging at their upper ends with the underside of the top plate 2. Each web 44 also merges at its side edges with the adjacent sides of the side walls 32, 32 at the corresponding lateral edges thereof in areas substantially in alignment longitudinally of plate 2 at the juncture between each side wall 32 with the adjacent legs of the webs 40, as may be readily seen in Figure 4. It will be noted that webs 44, 44 together with webs 32, 32 form a box-section column.

The lower ends of the side walls 32, 32 are flared downwardly to provide adjacent each end wall 18 of the bottom follower a pair of spaced ledges 46, 46. These ledges are each cored away at their inner sides as at 48 to lighten the structure and are substantially of triangular form in side elevation. The ledges 46, 46 provide on their upper edges downwardly sloping wedge surfaces 50, 50.

Each pair of ledges 46, 46 and the adjacent wall 44 of the top follower 12 form a pocket 52 (Figure 4) within which is disposed a friction shoe 54.

Figure 6:
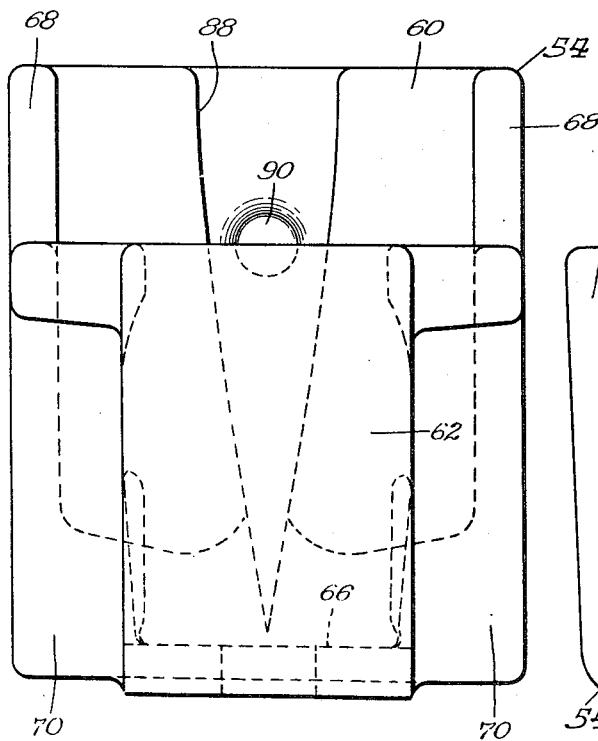
Figure 7:
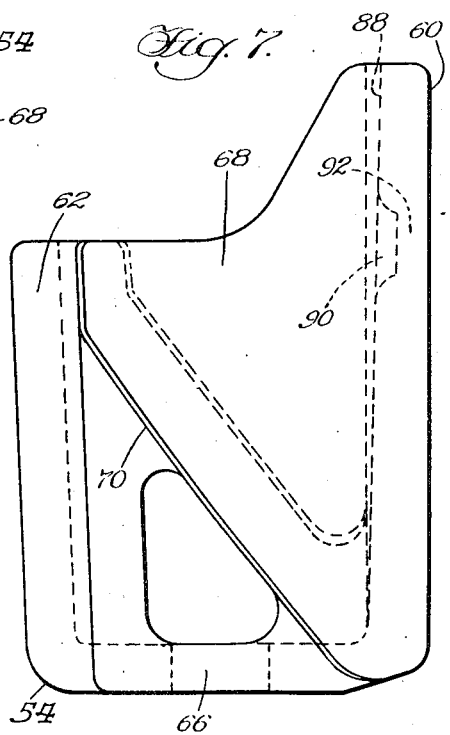

Each shoe 54 is in general a cuplike structure and, as best seen in Figures 5 to 7, comprises a front friction wall 60, an arcuate rear wall 62, a bottom wall 66, and lateral or side walls 68, 68, said lateral walls 68, 68 being formed to provide wing portions presenting on the bottoms thereof diagonal surfaces 70, 70 for engagement with surfaces 50, 50 on the associated ledges 46, 46 of the top follower as hereinafter described. Each shoe is urged into engagement with the related surfaces 50, 50 by a vertical coil spring 72 received within the shoe and positioned therein between the surrounding walls of the shoe, each spring 72 being seated as at 74 against the bottom wall 66 of the associated shoe and extending between the associated pair of ledges 46, 46 of the top follower and wedge faces 70 of the shoe and being seated as at 76 against the underside of the top spring plate 2 and being positioned at the upper end thereof by the adjacent ends 77, 77 (Figure 4) of the webs 38, 38 of the associated gussets 34, 34. The springs urge the respective shoes into engagement with the diagonal surfaces on the ledges of the top follower and along said surfaces outwardly and downwardly to engage the friction surface 78 of the friction wall 60 of each shoe as at 80 with the adjacent wear plate 82 secured as by welding at 84, 84 to the inner side of the related end wall of the bottom follower 14.

It will be understood that the surfaces 70, 70 on the wing portions of each shoe are disposed in planes converging toward the rear wall of the shoe. Furthermore, each of these surfaces are convexly or outwardly curved and, when all the parts are new, are designed to engage as at 86 similarly arranged outwardly or convexly curved surfaces 50, 50, hereinbefore discussed, on the associated ledges 46, 46 of the top follower. It will be understood that the engagement at points 86, 86 at opposite sides of the shoe between associated surfaces 70, 70 and surfaces 50, 50 are designed to be aligned longitudinally of the spring group in a vertical plane passing through the vertical or longitudinal axis of the associated shoe-actuating spring 72. It will be observed from a consideration of Figure 2 that the points 86 are disposed below the upper edges of the wear plate 82 in the normally expanded position of the spring group and that by aligning the points 86 with the axis of the associated shoe-actuating spring, the shoe is held in a position wherein the front wall 60 is maintained vertical. This point 86 of engagement of the associated surfaces 50 and 74 takes place at the crest of the curves of the same.

In order to accommodate rocking movement of each shoe and to prevent abutment and abrading between the inner side of the front wall of each shoe or the rear wall thereof with the associated actuating spring, the rear wall of each shoe diverges upwardly away from the front wall of the shoe in a direction away from the bottom wall of the shoe and the front wall of each shoe is cored away on its inner side as at 88 to present a surface diverging upwardly away from the spring and wall 62 in a direction away from wall 66.

It will be appreciated that as wear takes place on the wall 60 of the respective friction shoes, the shoes will be moved further and further downwardly and outwardly, whereby the crest of each surface 70 will become misaligned with respect to the crest of the related surface 50 and the wedging angle between these surfaces will be gradually increased to compensate for the slightly greater expansion of the associated shoe-actuating spring.

Another feature of the invention is the provision of a telltale on each shoe to indicate the extent of its wear to call the attention of the user that replacement is in order, said telltale comprising a recess 90 in the inner side of the friction wall of each shoe so that as the friction wall 60 of the shoe wears and becomes thinner and thinner in cross section, the portion of the wall indicated at 92 upon wearing away, will leave an opening through the shoe which is disposed at such a level that it may be easily seen in the expanded position of the spring group.

From the foregoing, it will be apparent that the friction shoes will be urged along the wedge surfaces of the top follower by the springs compressed between the shoes and the top spring plate and into engagement with the friction plates on the bottom follower in such manner as to afford substantially constant friction control of the oscillations of the springs 6, 6 under service conditions. Inasmuch as the wedge surfaces 50, 50 of each pair of ledges converge and the surfaces 70, 70 of the shoes similarly converge, the tendency for the shoes to slide laterally of the walls 32, 32 is substantially eliminated and should plates 2 and 4 move longitudinally relative to each other, the shoes will be caused to move with the upper plate and wear on their friction walls against the respective wear plates on the bottom follower instead of wearing on surfaces 70 and 50, which are relatively small and subject to more rapid wear.

In the assembly of the spring group, each shoe may have positioned therein the associated spring and thereafter the shoes may be received between the respective pairs of ledges 46, 46 at opposite sides of the top follower for engagement of the wing portions of the shoes with the wedge or diagonal surfaces of the related ledges. The shoes may then be urged toward each other by means of a suitable fixture, such as a jig, to permit convenient reception of the assembly within the bottom follower and the fixture removed. Before inserting the assembly into the bottom follower, the springs 6, 6 are positioned at the corners of the bottom plate.

To permit the insertion of the spring group between supporting and supported members of a railway car truck, such as a bolster and side frame, the height of the spring group may be decreased by compressing the springs 6, 6 prior to assembly with the truck to bring the substantially vertical slots 93, 93, which are formed in the side or lateral walls 16, 16 of the bottom follower, into alignment longitudinally of the group with the substantially vertical openings or slots 94, 94 provided between the walls 44, 44 in the side walls 32, 32 of the top follower. After these slots are aligned, a bar 96 may be inserted within these openings to maintain the spring group height within the limits permitting its ready assembly with the car truck. It will be noted that the slots 94 in the side walls 32, 32 provide a space vertically above the bar, and the slots in the side walls 16, 16 provide a space vertically below the bar in the assembled position of the bar with the followers, which has the advantage of accommodating the placement of the bolster on the spring group and loading the springs 6, 6 without imposing a load on either follower or the bar. Furthermore, as the springs 6, 6 are compressed by loading the device, the bar may be readily removed.

To position the spring group with respect to the bolster and side frame, each plate 2 and 4 may be provided with external bosses 98, 98.

I claim:

1. In a spring plate for a spring group, a relatively flat plate member, a follower on the inner side of said plate member disposed substantially centrally thereof, said follower comprising spaced substantially parallel side walls extending substantially at right angles to said plate member and merging at one of their corresponding ends with the inner side of said plate member, spaced webs interconnecting said side walls at their corresponding lateral edges, said webs being of arcuate form in cross section and being bowed toward each other and being connected at one of their corresponding ends with the inner side of said plate member, the juncture between said side walls and said plate member being reinforced by gussets integrally formed with the lateral edges of said side walls and the inner side of said plate member, each of said gussets comprising a web extending in the plane of the associated side wall, each of said last-mentioned webs terminating in a web extending transversely thereof and fromed integral with the inner side of said plate member, wedge means on the lateral edges of the respective side walls at the ends thereof remote from said plate member, and reinforcing means formed on the inner side of said plate member at the remote sides of said side walls, each of said reinforcing means merging with the related side wall at points in alignment transversely of said side wall with the respective points of merger of said arcuate webs with said side wall.

2. In a spring plate for a spring group, a relatively flat plate member, a follower on the inner side of said plate member disposed substantially centrally thereof, said follower comprising spaced substantially parallel side walls extending substantially at right anges to said plate member, said side walls merging at one of their correesponding ends with the inner side of said plate member, spaced webs interconnecting said side walls at their corresponding lateral edges, said webs being of arcuate form in cross section and being bowed toward each other and being connected at one of their corresponding ends with the inner side of said plate member, the juncture between said side walls and said plate member being reinforced by gussets integrally formed with the lateral edges of said side walls and the inner side of said plate member, each of said gussets comprising a web extending in the plane of the associated side wall, each of said last-mentioned webs terminating in a web extending transversely thereof and formed integral with the inner side of said plate member, and wedge means on the lateral edges of the respective side walls at the ends thereof remote from said plate member.

3. In a spring plate for a spring group, a plate member, a friction shoe carrier disposed substantially centrally on said plate member and comprising spaced substantially parallel walls merging at one of their corresponding ends with the inner side of said plate member, spaced webs extending between said walls adjacent opposite edges thereof and interconnecting the same and merging at one of their ends with the inner side of the said plate member, independent means connecting the lateral edges and the remote sides of said side walls with said plate member, said side walls being formed on their lateral edges at the ends remote from said plate member with ledges each presenting a wedge surface diverging away from said plate member, the ledges on the corresponding lateral edges of said side walls being arranged in pairs at opposite sides of said carrier to define shoe-receiving pockets therebetween, the wedge surfaces of respective pairs of ledges converging in a direction substantially transversely of said carrier.

CLAUS J. WERNER CLASEN.

REFERENCES CITED

The following references are of record in the file of this patent:

UNITED STATES PATENTS

| Number | Name | Date |
|---|---|---|
| 1,946,670 | Winters | Mar. 6, 1934 |
| 1,977,177 | Florez | Oct. 16, 1934 |
| 2,078,703 | Wisniewski | Apr. 27, 1937 |
| 2,118,006 | Couch | May 17, 1938 |
| 2,197,783 | Barrows | Apr. 23, 1940 |
| 2,356,742 | Bachman | Aug. 29, 1944 |
| 2,398,751 | Light | Apr. 16, 1946 |
| 2,413,458 | Light | Dec. 31, 1946 |